United States Patent
Butler

(10) Patent No.: US 9,122,075 B2
(45) Date of Patent: Sep. 1, 2015

(54) EYEGLASSES WITH ALTERNATIVE WEARING MEANS

(71) Applicant: Tracey Butler, Essex Fells, NJ (US)

(72) Inventor: Tracey Butler, Essex Fells, NJ (US)

( * ) Notice: Subject to any disclaimer, the term of this patent is extended or adjusted under 35 U.S.C. 154(b) by 29 days.

(21) Appl. No.: 14/018,696

(22) Filed: Sep. 5, 2013

(65) Prior Publication Data

US 2014/0063440 A1    Mar. 6, 2014

Related U.S. Application Data

(60) Provisional application No. 61/697,630, filed on Sep. 6, 2012.

(51) Int. Cl.
| | |
|---|---|
| *G02C 5/16* | (2006.01) |
| *G02C 3/04* | (2006.01) |
| *G02C 5/00* | (2006.01) |
| *G02C 5/06* | (2006.01) |

(52) U.S. Cl.
CPC ........ *G02C 3/04* (2013.01); *G02C 5/008* (2013.01); *G02C 5/06* (2013.01); *G02C 5/16* (2013.01)

(58) Field of Classification Search
CPC ............ G02C 5/006; G02C 5/04; G02C 5/06; G02C 5/08; G02C 5/14; G02C 5/143; G02C 5/146; G02C 5/16; G02C 5/18; G02C 5/20; G02C 5/2254
USPC .................... 351/63, 111, 113–115, 126, 128
See application file for complete search history.

(56) References Cited

U.S. PATENT DOCUMENTS

| | | |
|---|---|---|
| 3,673,610 A | 7/1972 | Liautaud |
| 4,152,051 A | 5/1979 | Van Tiem et al. |
| 4,549,793 A | 10/1985 | Yoon |
| 4,712,254 A | 12/1987 | Daigle |
| 4,720,186 A * | 1/1988 | Douillard ................. 351/63 |
| 5,092,667 A | 3/1992 | Bagley |
| 5,129,106 A | 7/1992 | Liou |
| 5,162,823 A | 11/1992 | Goldstein |
| D354,970 S | 1/1995 | Bolle |
| 5,647,061 A | 7/1997 | Marcus |
| 5,771,500 A | 6/1998 | Mayes |
| 5,786,882 A | 7/1998 | Satterthwaite |
| 6,000,795 A | 12/1999 | Van Rysselberghe |
| 6,036,310 A | 3/2000 | Moetteli |

(Continued)

FOREIGN PATENT DOCUMENTS

| | | |
|---|---|---|
| EP | 0223371 B1 | 5/1987 |
| JP | 2005043843 A | 2/2005 |
| WO | WO88/01495 A1 | 3/1988 |

*Primary Examiner* — Huy K Mai

(74) *Attorney, Agent, or Firm* — Gearhart Law, LLC

(57) ABSTRACT

The present disclosure refers to eyeglasses that may be worn in alternate forms. The eyeglasses include an eyepiece having a pair of lenses that may be positioned in front of a wear's eyes by an attachment assembly, which may be deformed or adjusted to secure the lenses to the wear's wrist. The design of the attachment assembly may vary according to specific needs. In one embodiment, the attachment assembly comprises temples having temple tips. The temples may be deformed to serve alternating purposes—placing the eyepiece in front of the eyes and securing the eye piece around the wear's wrist, or other body parts. The eyepiece may also include a bendable bridge that connects the two lenses. The design of the bridge may facilitate the transition of the eyepiece from one position to the other. The eyeglasses are suitable for individuals that wear eyeglasses periodically and particularly in outdoor settings.

12 Claims, 3 Drawing Sheets

(56) References Cited

U.S. PATENT DOCUMENTS

| | | |
|---|---|---|
| 6,052,823 A | 4/2000 | Wilks |
| 6,115,843 A | 9/2000 | Travalgia |
| 6,196,676 B1 | 3/2001 | Tabacchi |
| 6,247,811 B1 | 6/2001 | Rhoades et al. |
| 6,547,388 B1 | 4/2003 | Bohn |
| 6,629,760 B1 | 10/2003 | Razin |
| 7,059,717 B2 | 6/2006 | Bloch |
| 7,062,798 B2 | 6/2006 | Wu |
| 7,284,855 B2 | 10/2007 | Bent |
| 7,287,851 B2 * | 10/2007 | Amioka ................ 351/114 |
| 7,325,920 B1 | 2/2008 | Gelfuso |
| 7,347,544 B1 | 3/2008 | McLaughlin |
| 7,427,133 B2 | 9/2008 | Carter |
| 7,562,978 B2 | 7/2009 | Chen |
| 7,594,278 B2 | 9/2009 | Huh |
| 7,698,752 B2 | 4/2010 | Pennell et al. |
| 7,748,843 B2 | 7/2010 | Stewart |
| 7,845,794 B1 | 12/2010 | Chuo |
| 7,896,492 B2 | 3/2011 | Pettingill |
| 8,070,288 B2 | 12/2011 | Heyman et al. |
| 8,096,652 B1 | 1/2012 | Carbone |
| 8,894,200 B2 * | 11/2014 | Jirsa et al. ................ 351/118 |

* cited by examiner

EYEGLASSES WITH ALTERNATIVE WEARING MEANS

CLAIM OF PRIORITY

This application claims the priority of U.S. Ser. No. 61/697,630 filed on Sep. 6, 2012, the contents of which are fully incorporated herein by reference.

FIELD OF THE INVENTION

The current invention relates to eyeglasses that may be easily carried around when they are not worn by a user. In particular, the current invention relates to eyeglasses that may be carried on a person's wrist or other locations when the eyeglasses are not placed in front the user's eyes.

BACKGROUND OF THE INVENTION

Eyeglasses, or spectacles, are being worn by a great number of people for varying purposes. Some people wear eyeglasses for vision correction. In such cases, the wearer usually uses eyeglasses to alleviate the problems caused by conditions such as nearsightedness (myopia), farsightedness (hyperopia), or astigmatism. On the other hand, many people wear eyeglass not due to medical reasons, but just for the practical purpose such as protection against flying debris and reduction of direct exposure to bright or harmful light, especially ultraviolet light. Such eyeglasses, including safety glasses, sport glasses, and sun glasses, are widely in use. Moreover, some eyeglasses are worn entirely as personal accessories for aesthetic or fashion purposes.

Most of the eyeglasses designed for protective and aesthetic reasons are only worn occasionally or periodically by users because the need for wearing such glasses does not arise all the time. Even for eyeglasses worn for vision correction, most people, especially those with only minor conditions, do not wear them all the time.

Naturally, problems arise due to the putting-on and taking-off transition for eyeglasses. In particular, the wearer has to find a location to keep the eyeglasses when they are not in use. Such a problem is especially acute for the eyeglasses used in outdoor settings. For example, a person wearing sun glasses during a hiking trip may want to put the sun glasses away when the ambient light is not bright. However, having a separate container for the sun glasses may prove to be bulky and inconvenient; holding the sun glasses in the wearer's hand may be cumbersome and unsafe; putting the sun glasses directly in the wear's pocket may damage the glasses. Such difficulties arise more frequently and more widely than people anticipate. The current invention aims to address this issue.

Descriptions of Related Arts

U.S. Pat. No. 4,712,254 discloses a headband and eyeglasses combination comprising a headband element which is receivable on the head of a wearer and has an open pocket formed therein, an eye-piece which is receivable in the pocket and a mounting assembly for mounting the eyepiece on the headband element. The eyepiece is mounted on the headband element so that it is alternatively positionable in a retracted first position wherein it is received in the pocket for use of the device as a conventional headband or an operative second position wherein it extends from the headband element for use of the device as a headband and eyeglass combination.

U.S. Pat. No. 7,748,843 discloses watchband eyeglasses including a combination of flexible Pince-Nez reading glasses that rest securely on the wearer's nose, and wrist-worn case for housing the reading glasses when not in use. Various embodiments of the case are disclosed including: (1) a bracelet or (2) a universal attachment for any existing metal, plastic or fabric watchband; or (3) a dual-function case that is itself also a watchband. In all the embodiments the case incorporates a storage compartment or sleeve that facilitates carrying of the eyeglasses at all times, to make the eyeglasses more accessible.

The inventions identified above, however, do not address all the practical issues raised herein. For example, the watchband eyeglasses are generally complex in structure and easy to break. The headband and eyeglasses combination, on the other hand, is difficult to adjust and hard to put away. The current invention, instead, utilizes a simple and elegant design to satisfy all the needs of a wearer to have a pair of alternative wearing eyeglasses.

In summary, various devices are known in the art, but their structures are distinctively different from the current invention. Moreover, the other inventions fail to address all of the problems solved by the invention described herein. One embodiment of this invention is illustrated in the accompanying drawings and will be described in more detail herein below.

SUMMARY OF THE INVENTION

The current invention discloses alternative wearing eyeglasses, comprising: an eyepiece and an attachment assembly, wherein the attachment assembly is capable of positioning the eyepiece in front of the eyes of the wearer, and in an alternative form, the attachment assembly is capable of securing the eyepiece to the wrist, other body parts of the wearer, or other locations. The alternating design is the key feature of the current invention.

Here, the term "eyeglasses" is broadly defined and it may refer to any types of glasses, goggles, spectacles, and eye wares that may be worn in front of a user's eyes. The eyeglasses here may refer to glasses for vision correction, for sun protection, for sports activities, and for fashion.

In general, the eyepiece refers to the part of the eyeglasses that is directly positioned in front of a user's eyes. The eyepiece in the alternative wearing eyeglasses may be similar to the eyepieces in regular eyeglasses. A typical eyepiece includes a pair of lenses that may be positioned in front of the wear's eyes. The lenses may be framed or un-framed. The frames may be any shape, size, and design. In addition, the eyepiece may include a bridge connecting the two lenses. Other structure may also be a part of the eyepiece to improve functionality of the eyeglasses. For example, a top bar may be positioned in parallel to the bridge and used as an additional structure to strengthen the connection between the two lenses. The eyepiece may also include a pair of nose pads, serving as support structures for the lenses.

The attachment assembly may vary in its designs. In one embodiment, the attachment assembly may comprise temples having temple tips, wherein the temples are connected to the eyepiece, and in particular, the lenses, directly or indirectly. When the eyeglasses are "in use" or being "worn"—the eyepiece being placed in front of a wearer's eyes—the temples may be used to stabilize the eyeglasses and the temple tips may be generally positioned on and partly around the wearer's ears. When the eyeglasses are not in use, it is desirable to place the eyeglasses in a location that is unlikely to damage the glasses and is convenient to access.

To achieve this goal, the temples may be deformable or adjustable so that the eyepiece may be attached to other parts of the body, including the wrist and forehead. The temples may be made from deformable materials, allowing the temples to be bent and wrapped around the wrist, securing the eye piece to the wrist of the user as well. Depending on the occasion and the need of the user, the eyeglasses may be placed in other locations. For example, with the deformable temples, the eyeglasses may be wrapped around a user's forehead. In such cases, the temples may be designed longer than the temples for regular eyeglasses, and the temple tips, normally curved structures, may also be bent to line up with other parts of the temples.

It should be noted that the deformable temples are only one possible design for the attachment assembly. To allow damage-free and convenient re-positioning of the eyeglasses, the attachment assembly may include a band or a strap that allows easy adjustment of the shape, accessibility, and adaptability of the attachment assembly. For example, another embodiment of the alternative wearing eyeglasses may have a deformable band that serves as the attachment assembly. The band may be used to position the eyepiece in front of the wearer's eyes. The band may form an entire circle, may be deformed and coiled, and may be wrapped around a wearer's wrist or forehead when the eyepiece is not in use. Such designs are also in the purview of the current invention.

The materials to make up the attachment assembly, such as the deformable temples, are preferred to be flexible, durable, bendable, and strong. The materials that may be used include but are not limited to: metals such as flexible stainless steel and aluminum alloy, and other materials fitting the needs of alternative wearing eyeglasses. It is also desirable that the materials have bistable characteristics. The preferred materials include spring bands made from layered and flexible stainless steel.

Aside from the attachment assembly, other parts of the eyeglasses may be adjustable to facilitate the alternative wearing feature of the current invention. The bridge connecting the lenses, for example, may also be deformable so that when the eyepiece is secured to a user's wrist, the bridge may be bent, allowing the eyeglasses to conform better to the location to which it is attached. In addition, the bridge may be connected to the frames or lenses with hinge structures, allowing angular alternation between the bridge and the lenses. Such a design also makes the bridge adjustable for the transition of the eyepiece from one position to another. It should also be noted that the features indicated above are not mutually exclusive. As long as readjustment of the eyeglasses is improved, the bridge may be both deformable and connected by hinges to the frames or lenses.

In general, the present invention succeeds in conferring the following, and others not mentioned, desirable and useful benefits and objectives.

It is an object of the present invention to provide alternative wearing eyeglasses that allow convenient repositioning of the eyeglasses from in front of a user's eyes to other locations.

It is an object of the present invention to provide alternative wearing eyeglasses that may be securely attached to a user's wrist or other body parts.

It is an object of the present invention to provide alternative wearing eyeglasses that do not require additional containers.

It is an object of the present invention to provide alternative wearing eyeglasses that may have varying eyepieces that fit different kinds of needs.

It is an object of the present invention to provide alternative wearing eyeglasses that are simple in structure and easy to manufacture.

It is an object of the present invention to provide alternative wearing eyeglasses that are suitable for outdoor settings.

It is another object of the current invention to provide alternative wearing eyeglasses that are light and easy to use.

It is another object of the current invention to provide alternative wearing eyeglasses that have temples made from deformable materials.

It is still another object of the current invention to provide alternative wearing eyeglasses that have temples made from materials that are flexible, durable, bendable, strong, and with bistable characteristics.

It is another object of the current invention to provide alternative wearing eyeglasses with an eyepiece having an adjustable bridge connecting two lenses.

It is yet another object of the current invention to provide alternative wearing eyeglasses that are sun glasses and/or sport glasses.

It is another object of the current invention to provide alternative wearing eyeglasses that have accessories that may also be adjusted to allow easy re-positioning.

It is yet another object of the current invention to provide alternative wearing eyeglasses that have a deformable band.

It is an object of the present invention to provide alternative wearing eyeglasses that may have a deformable band that serves to position the eyepiece in front of the user's eyes or attach the eyepiece to the user's wrist or other body parts.

DESCRIPTION OF THE PREFERRED EMBODIMENTS

Figure 1:
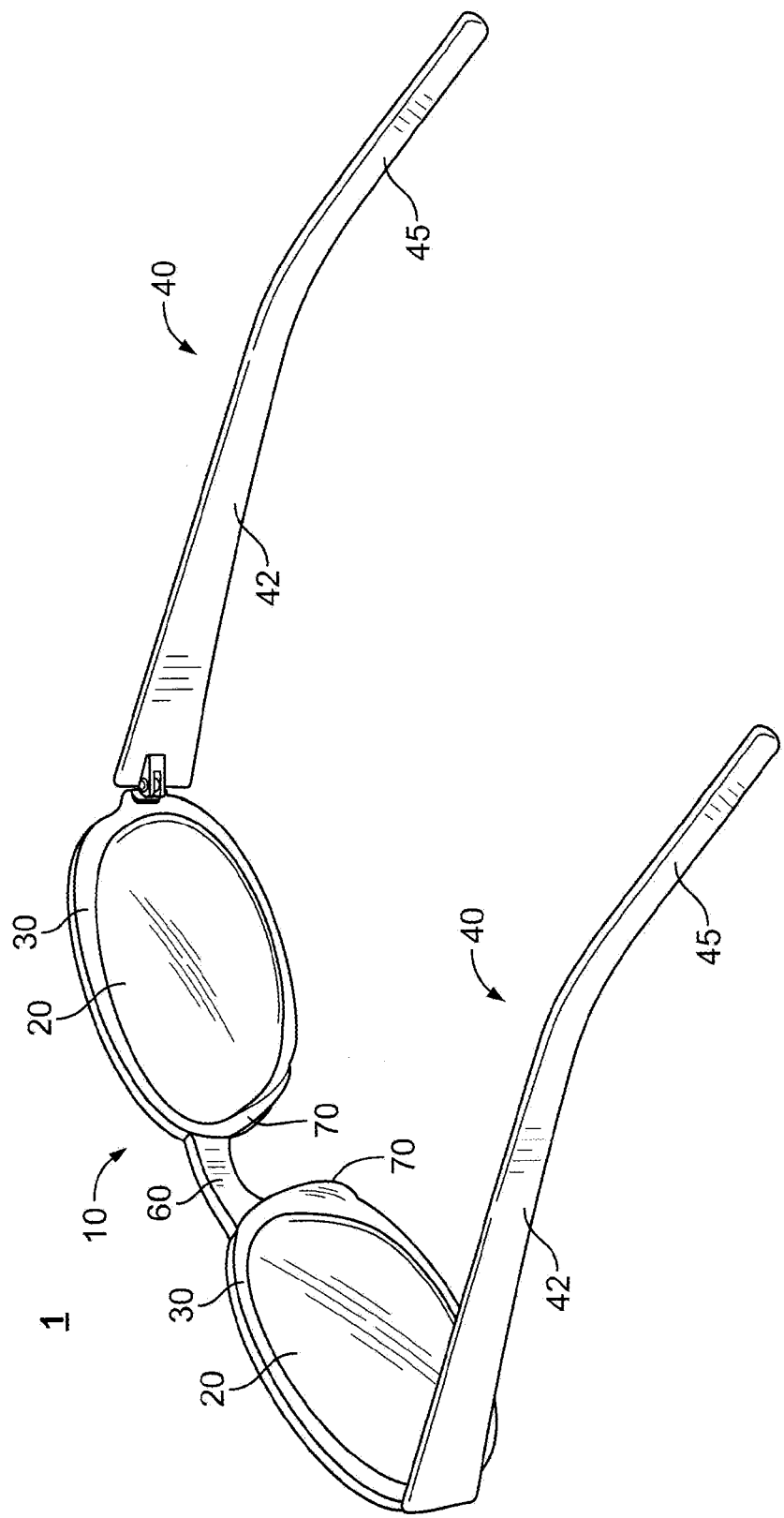
FIG. 1 shows a top perspective view of a first embodiment of alternative wearing eyeglasses.

The preferred embodiments of the present invention will now be described with reference to the drawings. Identical elements in the various figures are identified, as far as possible, with the same reference numerals. Reference will now be made in detail to embodiments of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto without deviating from the innovative concepts of the invention.

FIG. 1 shows a top perspective view of a first embodiment of alternative wearing eyeglasses 1. Shown in FIG. 1 are the eyeglasses 1 having an eyepiece 10 and two temples 40, which may be considered an attachment assembly. The eyepiece 10 has two lenses 20 encircled by frames 30, a bridge 60 connecting the frames 30, and two nose pads 70 connected to the frames 30. The temples 40 have temple bars 42 and temple tips 45.

In FIG. 1, the alternative wearing eyeglasses 1 have a shape and design generally similar to regular eyeglasses. It should be noted that the design shown in FIG. 1 is only one of the possible forms the alternative wearing eyeglasses may take. As indicated above, the term "eyeglasses" is defined broadly. The frames 30 are optional structures that encircle the lenses 20. The bridge 60, as shown in FIG. 1, connects the frames 30. However, it should be noted that the main function of the bridge 60 is to connect the lenses 20, though in an indirect manner. For the designs in which the frames 30 are absent, the bridge 60 may attach to the lenses 20 directly.

Referring to FIG. 1, the alternative wearing eyeglasses 1 are in the form in which they may be worn—the eyepiece 10 being positioned in front of a wearer's eyes. In such a form, the nose pads 70 are placed on the wearer's nose, the temple bars 42 stay straight and horizontal, and the temple tips 45 are positioned above and/or partly around the wearer's ears. The temple tips 45 are preferred to articulate modestly from the temples bars 42. With such a design, which is optional, the temple tips 45 stays above and partly around the wearer's ears.

Figure 2:
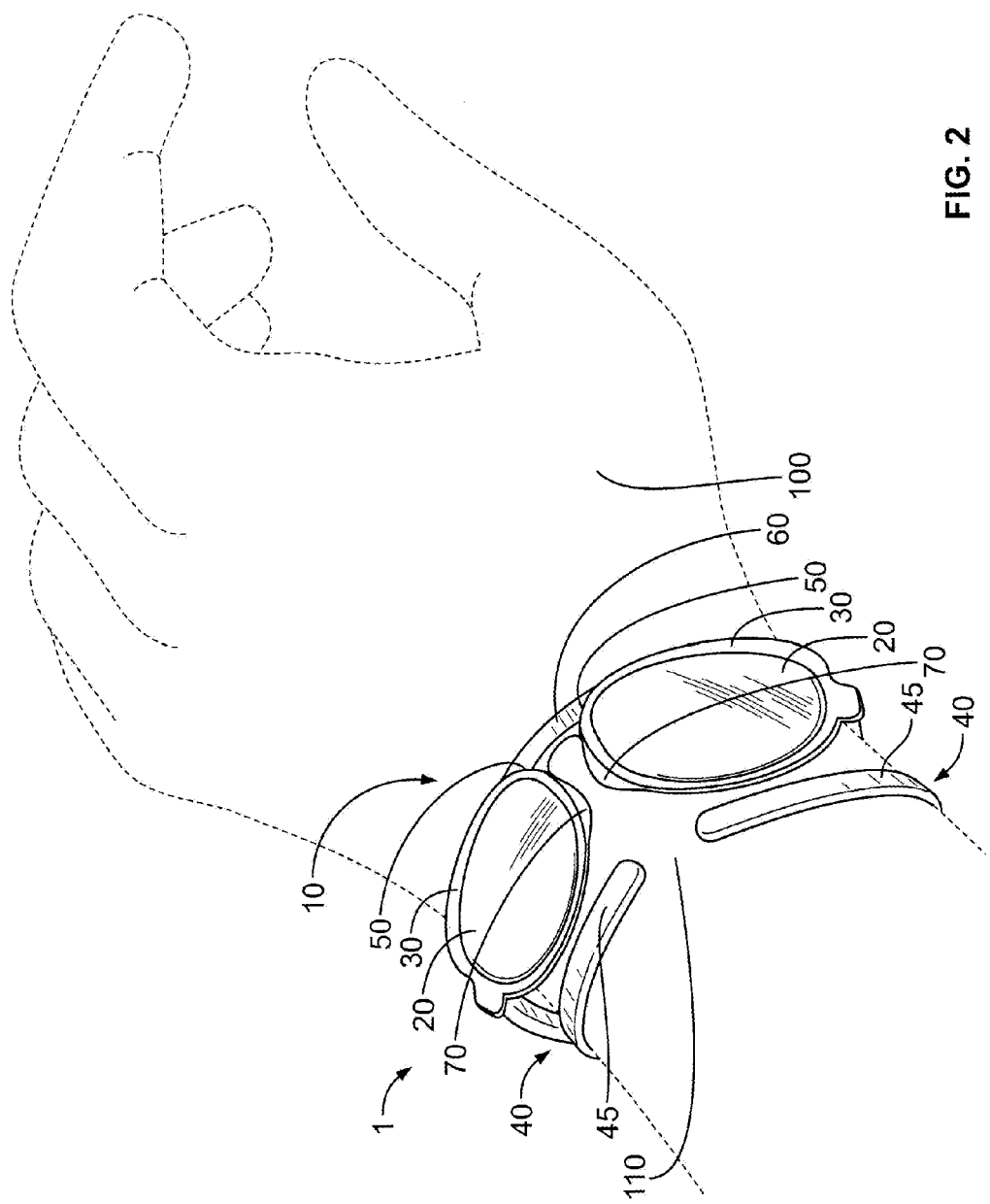
FIG. 2 shows a top view of the first embodiment of the alternative wearing eyeglasses when the eyeglasses are attached to a user's wrist.

FIG. 2 shows a top view of the first embodiment of the alternative wearing eyeglasses 1 when the eyeglasses are attached to a user's wrist. Shown in FIG. 2 are the eyeglasses 1 having an eyepiece 10 and two temples 40, which may be considered an attachment assembly. The eyepiece 10 has two lenses 20 encircled by frames 30, a bridge 60 connecting the frames 30, and two nose pads 70 connected to the frames 30. The temples 40 have temple bars 42 (not shown in FIG. 2) and temple tips 45. Also shown in FIG. 2 are a user's hand 100 and wrist 110. The temples 40 are wrapped around the wrist 110, securing the eyepiece 10 in place.

The key feature of the alternative wearing eyeglasses 1 is that the attachment assembly in this embodiment, the temples 40—may deform and allow the eyepiece 10 to be positioned to different parts of a user's body. When the temples 40 are put into forms shown in FIG. 1, the eyepiece 10 may be placed in front of the user's eyes. When the temples 40 are deformed so that the temples 40 wrap around a user's wrist, as shown in FIG. 2, the eyepiece 10 is secured to a user's wrist. The attachment of the alternative wearing eyeglasses 1 is preferred to be secure but not too tight, similar to how a wrist watch is attached.

As indicated above, the materials to make up the deformable temples 40, are preferred to be flexible, durable, bendable, and strong. The materials that may be used include but are not limited to: metals such as flexible stainless steel and aluminum alloy, bendable fiberglass, deformable plastics, and other materials fitting the needs of alternative wearing eyeglasses 1, or any combination thereof. It is desirable that the materials have bistable characteristics. The preferred materials include spring bands made from layered and flexible stainless steel. The temples 40 may also include temple covers made from fabric or plastics that shield the other parts of the temples 40.

It should also be noted that the attachment assembly may not be the only structures that are adjustable in the alternative wearing eyeglasses 1. The bridge 60, for instance, may be deformable. The bridge 60 may be made from the materials listed above for the temples 40. When the eyeglasses 1 are secured to a user's wrist, or any part of the user's body, the bridge 60 may bend and allow the frames 30 and lenses 20 to articulate modestly so that the eyepiece 10 may generally conform to the contours of the wrist 110. In addition, the bridge 60 may be connected to the frames 30 with hinge structures that allow the articulation of the frames 30 and the lenses 20. The two designs—the bendable bridge and the hinge structures—may be individually implemented or may be applied at the same time.

In addition, the nose pads 70 are preferred to be small, as shown in FIG. 2, so that they do not stick heavily against the wrist of the user and do not get in the way of bending the temple 40 and securing the eyepiece 10 to the wrist 110.

Figure 3:
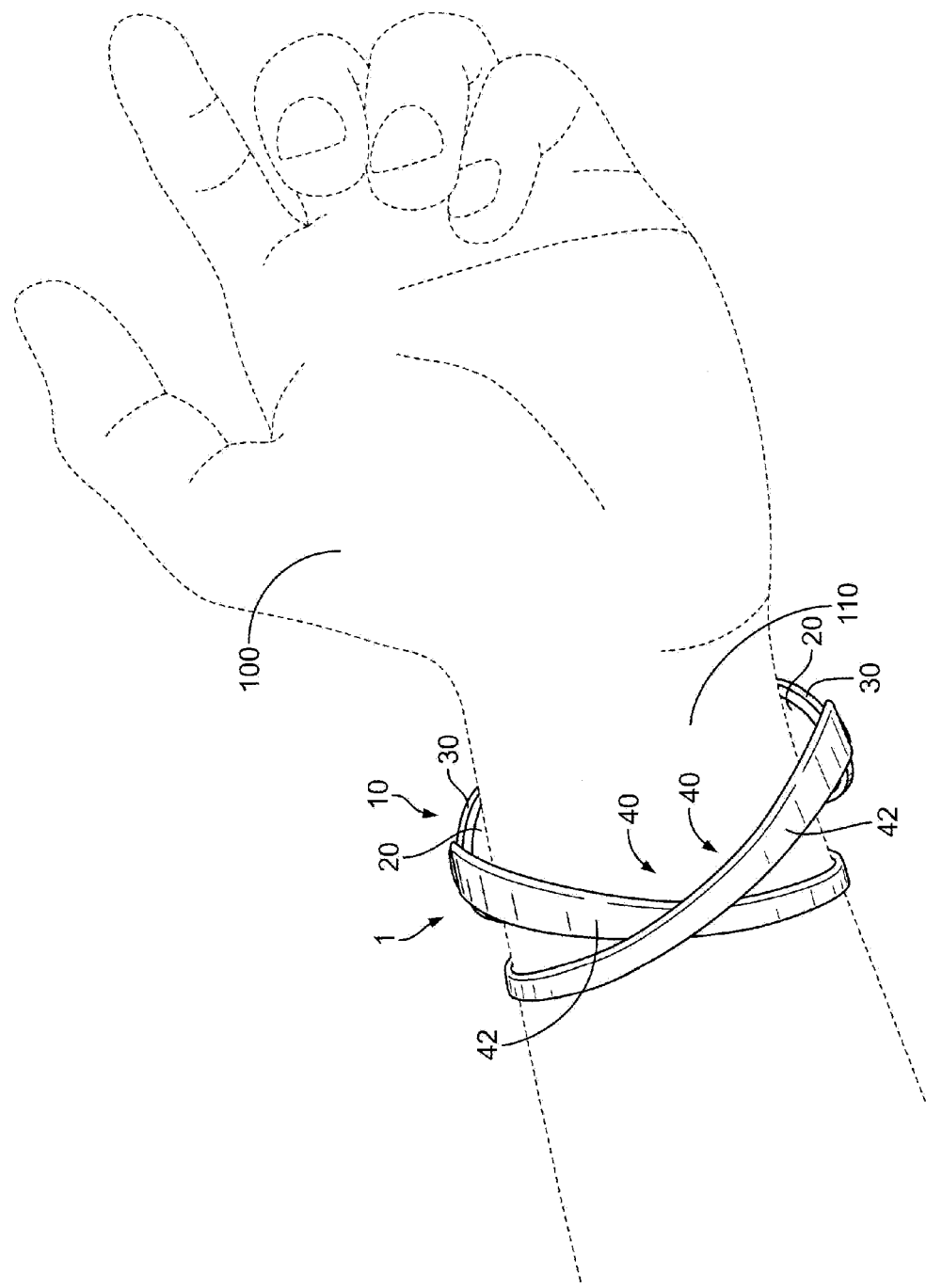
FIG. 3 shows a bottom view of the first embodiment of the alternative wearing eyeglasses when the eyeglasses are attached to a user's wrist.

FIG. 3 shows a bottom view of the first embodiment of the alternative wearing eyeglasses when the eyeglasses are attached to a user's wrist. Shown in FIG. 3 are the eyeglasses 1 having an eyepiece 10 and two temples 40, which may be considered an attachment assembly. The eyepiece 10 has two lenses 20 encircled by frames 30. The temples 40 have temple bars 42. Also shown in FIG. 3 are a user's hand 100 and wrist 110. The temples 40 are wrapped around the wrist 110, securing the eyepiece 10 in place.

The alternative wearing eyeglasses 1, as shown in FIGS. 1-3, may be suitable for many uses. For example, the alternative wearing eyeglasses 1 may be used for sun glasses. A user may wear the eyeglasses when the ambient light is bright and attach the eyeglasses to his/her wrist when the brightness subsides. During an outing involving constant movement, such as a hiking trip, attaching the eyeglasses to one's wrist allows convenient transition of putting-on and taking-off of the eyeglasses and affords a more secure location to place the eyeglasses, comparing with the traditional headband design. Nevertheless, the alternative wearing eyeglasses may be attached to locations other than a person's wrist. As long as the requirements of easy transition and secure placement may be satisfied, the design of the attachment assembly may be altered to fit the specific needs of the user and the location where the eyeglasses are placed. In addition to the practical uses, the alternative wearing eyeglasses may serve as a fashion and aesthetic accessory to the user, both when they are placed in front of the user's eyes and secured to other locations.

It should also be noted that the attachment assembly may have designs different from the deformable temples as shown in FIGS. 1-3. For example, the attachment assembly may comprise two deformable bands that may form an entire circle by attaching the two bands together. The two bands may be deformed and coiled, and be wrapped around a wearer's wrist or forehead when the eyepiece is not in used.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. Alternative wearing eyeglasses, comprising:
   an eyepiece comprising a pair of lenses and a frame comprising at least a bridge and an attachment assembly, the frame at least partially surrounding each of the pair of lenses,
      wherein the bridge comprises a deformable material, the bridge coupling each of the pair of lenses,
      wherein the attachment assembly comprises temples, the temples having temple tips,
         wherein the temples are connected to the eyepiece,
         wherein the attachment assembly is capable of positioning the eyepiece in front of the eyes of a wearer, and
         wherein the attachment assembly is capable of securing the eyepiece to a wrist of the wearer; and
      wherein the temples comprise a layered material having a first stable position and a second stable position.

2. The alternative wearing eyeglasses of claim 1, wherein the bridge is connected to the frames with hinge structures that allow angular articulation between the bridge and the lenses.

3. The alternative wearing eyeglasses of claim 1, wherein the temples are capable of being deformed so that the temple tips are positioned above the ears of the wearer.

4. The alternative wearing eyeglasses of claim 1, wherein the temples are capable of being deformed from the first stable position to the second stable position so that the temples wrap around a wrist of the wearer.

5. The alternative wearing eyeglasses of claim 1, wherein the eyepiece further comprises nose pads sized not to affect the deformation of the temples to attach the eyepiece to the wrist of a user.

6. Alternative wearing eyeglasses, comprising
an eyepiece capable of being placed in front of the eyes of a wearer; wherein the eyepiece comprises
a pair of lenses,
frames attached to the lenses,
and a bridge connecting the frames;
and temples having temple tips, wherein
the temples are connected to the frames,
the temples are comprised of a material having a layered arrangement,
wherein the material is bistable capable of residing in a first position and a second position,
the bridge is capable of being bent so that the eyepiece is secured to the wrist of the wearer.

7. The alternative wearing eyeglasses of claim 6, wherein the eyepiece further comprises nose pads sized not to affect the deformation of the temples to attach the eyepiece to the wrist of a user.

8. Alternative wearing eyeglasses, comprising
an eyepiece capable of being placed in front of the eyes of a wearer; wherein the eyepiece comprises
a pair of lenses,
frames attached to the lenses,
and a bridge connecting the frames;
and temples having temple tips, wherein
the temples are connected to the frames,
the bridge is connected to the frames with hinge structures that allow angular articulation between the bridge and the lenses,
the temples are comprised layers of metal configured to provide bistable characteristics,
wherein temples are capable of residing in a first position and a second position,
the bridge is capable of being articulated from the frames so that the eyepiece is secured to the wrist of the wearer.

9. The alternative wearing eyeglasses of claim 8, wherein the eyepiece further comprises nose pads sized not to affect the deformation of the temples to attach the eyepiece to the wrist of a user.

10. The alternative wearing eyeglasses of claim 8, wherein the bridge is made from deformable materials, and
the bridge is capable of being bent and articulated from the frames so that the eyepiece is secured to the wrist of the wearer.

11. Alternative wearing eyeglasses, comprising
an eyepiece capable of being placed in front of the eyes of a wearer; wherein the eyepiece comprises
a pair of lenses,
frames attached to the lenses,
a bridge connecting the frames;
and nose pads connected to the frames;
and temples having temple tips, wherein
the temples are connected to the frames,
the temples are deformable spring bands made from layered and flexible stainless steel,
wherein the deformable spring bands are comprised layers of stainless steel configured to provide bistable characteristics,
wherein temples are capable of residing in a first position and a second position,
and the bridge is connected to the frames with hinge structures that allow angular articulation between the bridge and the lenses.

12. The alternative wearing eyeglasses of claim 11, wherein
the bridge is capable of being bent so that the eyepiece is secured to the wrist of the wearer.

* * * * *